United States Patent [19]

Fujihashi

[11] Patent Number: 5,555,167
[45] Date of Patent: Sep. 10, 1996

[54] POWER SUPPLY APPARATUS WITH A POWER-SAVING FUNCTION

[75] Inventor: Shigeru Fujihashi, Kawasaki, Japan

[73] Assignee: Fujitsu Limited, Kanagawa, Japan

[21] Appl. No.: 424,117

[22] Filed: Apr. 19, 1995

[30] Foreign Application Priority Data

Apr. 20, 1994 [JP] Japan .................................. 6-081767

[51] Int. Cl.⁶ ............................................... H02H 7/122
[52] U.S. Cl. ............................................... 363/49; 363/55
[58] Field of Search ................................. 363/49, 50, 55; 307/100, 125, 127, 130, 131, 132 R

[56] References Cited

U.S. PATENT DOCUMENTS

| | | | |
|---|---|---|---|
| 4,590,553 | 5/1986 | Noda | 364/200 |
| 5,212,836 | 5/1993 | Mashshita | 455/343 |
| 5,361,044 | 11/1993 | Norimatu et al. | 331/1 A |
| 5,404,544 | 4/1995 | Crayford | 395/750 |
| 5,408,369 | 4/1995 | Miura et al. | 360/75 |
| 5,446,645 | 8/1995 | Shirahama et al. | 363/55 |
| 5,488,551 | 1/1996 | Malik | 363/49 |

FOREIGN PATENT DOCUMENTS 56-25778  3/1981  Japan .
4-27578   1/1992  Japan .

*Primary Examiner*—Matthew V. Nguyen
*Attorney, Agent, or Firm*—Nikaido Marmelstein Murray & Oram LLP

[57] ABSTRACT

A power supply apparatus with power-saving function used in an information processing system includes: a main power supply unit having the conversion unit converting an input voltage to a first output voltage and outputting the first output voltage to the information processing system in response to the drive signal; a control power supply unit receiving the input voltage, converting the input voltage to a second output voltage, and outputting the second output voltage to the information processing system; a status supervisory unit connected to the information processing system for supervising a status indicating the system being in use or not used, and outputting a status information; an oscillation control unit connected between the status supervisory unit and the drive signal generation unit for generating an oscillation control signal to the drive signal generation unit in order to control generation of the drive signal in accordance with the status information; and a supply control unit connected between the status supervisory unit and the switch unit for generating a switch control signal to the switch unit in order to control turning on/off of the switch unit, and the switch unit connecting or disconnecting between the start unit and the drive signal generation unit.

4 Claims, 8 Drawing Sheets

POWER SUPPLY APPARATUS WITH A POWER-SAVING FUNCTION

BACKGROUND OF THE INVENTION

1. Field of the Invention

The present invention relates to a power supply apparatus with a power-saving function for use in .an information processing system.

2. Description of the Related Art

When a user utilizes an information processing system, it is troublesome for the user to turn on the power and start the system for every use thereof since a long waiting time is required so that the working efficiency is decreased. Accordingly, in general, the power to the system is always turned on even if it is not being used by the user, i.e., waiting (idle) time. From the view of power-saving, it is necessary to reduce the power consumption in the waiting time.

Recently, an international standard for power consumption (NUTEK; Spec 803299/92-92) has been established in the field of information processing system. This standard, established in Sweden, has been used as an international standard for the regulation of power consumption around the world.

According to this standard, briefly, the following specifications must be satisfied for a system to be considered to have a power-saving function. First, the power consumption in a stand-by or idle state of the system must not exceed thirty watts, and preferably, is under fifteen watts. Second, when the system is not used for more than seventy minutes, the power supply must automatically be turned off. However, if the power consumption of the system is under eight watts as a maximum value, preferably, under five watts, it is not necessary to turn off the power even if the system is not used more than seventy minutes.

Accordingly, it is desired to design a system to have a power consumption of eight watts, preferably, under five watts, in the waiting state.

In general, three states are considered for the power consumption, i.e., first, the power consumption at a normal use of the system; second, the power consumption at an initial detection of a start signal, a memory backup and heater back-up in a CRT; and third, the power consumption at the initial detection and the memory backup.

Therefore, it is desired to reduce the power consumption, particularly, the power consumption at the above second and third states under eight watts, preferably, under five watts, in the waiting state.

SUMMARY OF THE INVENTION

The object of the present invention is to provide a power supply apparatus with a power-saving function enabling a considerable power-saving effect in the waiting state of an information processing system.

In accordance with a first aspect of the present invention, there is provided a power supply apparatus with a power-saving function for use in an information processing system, including:

a main power supply unit having: a start unit, a switch unit, a drive signal generation unit and a conversion unit; the start unit receiving an input voltage and starting the driving signal generation unit through the switch unit; the drive signal generation unit generating a drive signal to the conversion unit; and the conversion unit converting the input voltage to a first output voltage, and outputting the first output voltage to the information processing system in response to the drive signal;

a control power supply unit receiving the input voltage, converting the input voltage to a second output voltage, and outputting the second output voltage to the information processing system;

a status supervisory unit connected to the information processing system for supervising the status of the system and indicating whether the system is in use or not, and outputting status information;

an oscillation control unit connected between the status supervisory unit and the drive signal generation unit for generating an oscillation control signal to the drive signal generation unit in order to control generation of the drive signal in accordance with the status information; and a supply control unit connected between the status supervisory unit and the switch unit for generating a switch control signal to the switch unit in order to control turning on/off of the switch unit, and the switch unit connecting or disconnecting the start unit and the drive signal generation unit.

In accordance with a second aspect of the present invention, there is provided a power supply apparatus with a power-saving function for use in an information processing system, including:

a switch unit for receiving an input voltage;

a main power supply unit for receiving the input voltage through the switch unit, converting the input voltage to a first output voltage, and outputting the first output voltage to the information processing system;

a control power supply unit for receiving the input voltage, converting the input voltage to a second output voltage, and outputting the second output voltage to said information processing system; and a status supervisory unit connected to the information processing system for supervising the status of the system and indicating whether the system is in use or not, and outputting status information to the switch unit in order to control turning on/off thereof in accordance with the status information.

In a preferred embodiment, the switch unit comprises a relay, and the control power supply unit further comprises a relay control unit for receiving the status information and generates the switch control signal to the relay in order to control turning on/off thereof.

In another preferred embodiment, the start unit is formed by one resistor.

DESCRIPTION OF THE PREFERRED EMBODIMENTS

Before describing preferred embodiments, a conventional art and its problems will be explained below.

Figure 1:
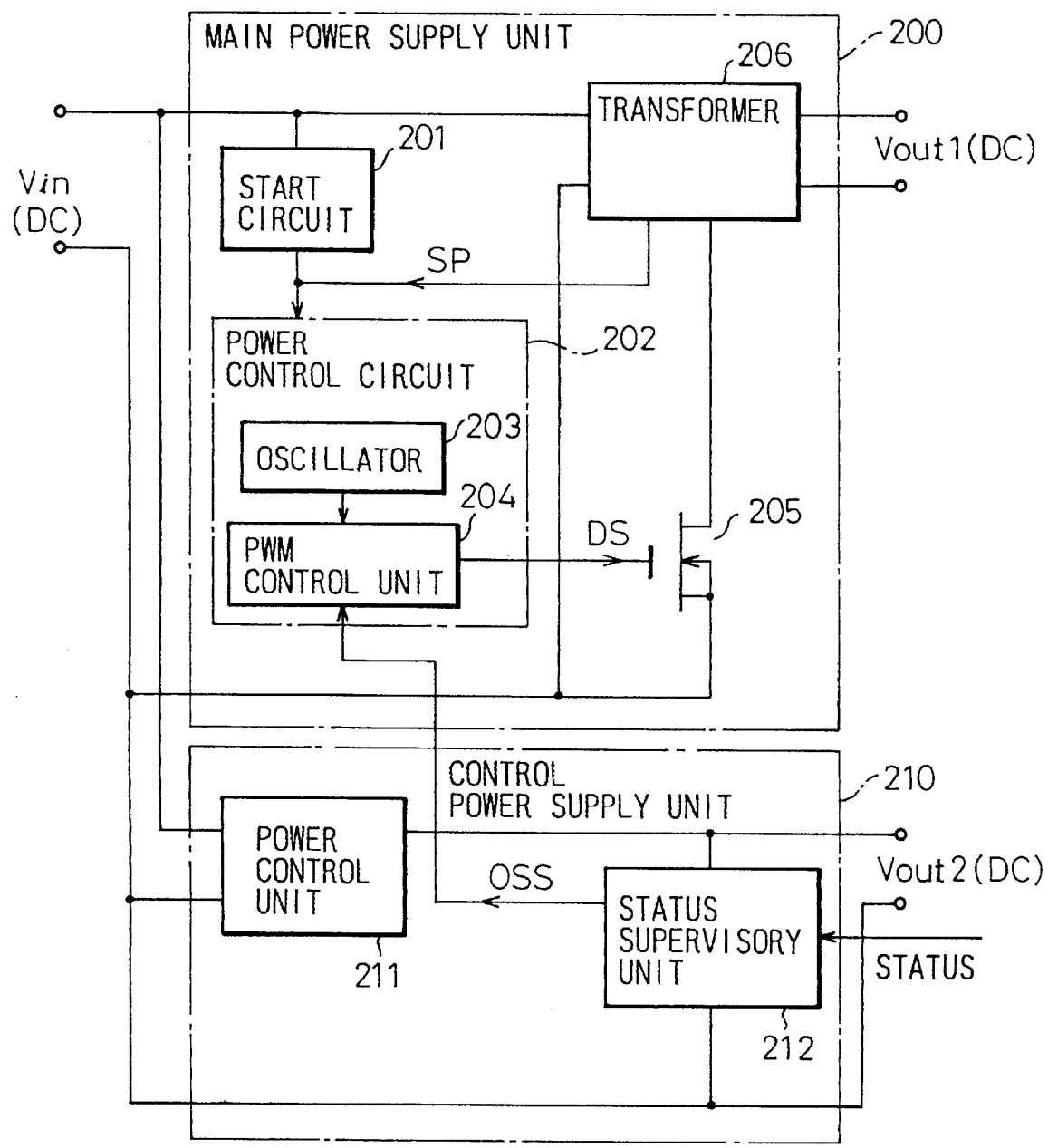
FIG. 1 shows one example of a conventional power supply apparatus with a power-saving function.

In FIG. 1, a conventional power supply apparatus includes a main power supply unit 200, and a control power supply unit 210. The main power supply unit 200 is used for supplying a first output DC voltage (Vout1) to drive units (for example, a CRT (cathode ray tube), various circuits, etc.) in an information processing system (see FIG. 2), and the control power supply unit 210 is used for supplying a second output DC voltage (Vout2) to control units (for example, a microcomputer, an input port for an initial signal detection, etc.) in the information processing system. An input DC voltage (Vin) is supplied in parallel to the main power supply unit 200 and the control power supply unit 210. In general, the input DC voltage is higher than the first/second output DC voltage, and is converted to the output DC voltage by using a conversion unit as explained below.

The main power supply unit 200 includes a start circuit 201, a power control circuit 202 and a transformer 206. Further, the power control circuit 202 includes an oscillator 203 and a PWM (pulse width modulation) control unit 204.

Initially, the start circuit 201 receives the DC voltage Vin and supplies it to the power control circuit 202 in order to start the oscillator 203. The oscillator 203 generates a drive signal DS to a gate of a field effect transistor (FET) 205 through the PWM control unit 204. The transistor 205 is alternately turned on/off in response to the drive signal DS. Since the transistor 205 is connected to the primary side of the transformer 206, the input DC voltage Vin is converted to an AC voltage in the primary side and further converted to a low AC voltage in the secondary side of the transformer 206. Still further, the lower AC voltage is converted to the first output DC voltage Vout1 through a regulator (not shown) provided in the transformer 206.

Further, the transformer 206 supplies a supplemental DC power SP from the primary side thereof to the power control circuit 202. When the power control circuit 202 receives the supplemental power SP from the transformer 206, the DC power from the start circuit 201 to the power control circuit 202 is cut-off, and the power control circuit 202 is activated only by the DC supplemental power SP.

On the other hand, the control power supply unit 210 includes a power control unit 211 and a status supervisory unit 212. The power control unit 211 includes a transformer and regulator (both not shown) in order to obtain the second DC voltage Vout2 which is used for the control units (for example, a microprocessor) in the information processing system 101.

The status supervisory unit 212 is connected to a keyboard or mouse which is operated by a user, and is used for supervising status of use (i.e., determining whether the system is in use or not) of the information processing system 101 by receiving a signal generated by the keyboard or mouse. When there is no input signal from the keyboard or mouse during a predetermined time interval (i.e., waiting time), the status supervisory unit 212 determines that the system is in the waiting state where no user is using the system. When detecting the waiting state, the status supervisory unit 212 generates an oscillation stop signal OSS to the PWM control unit 204 of the power control circuit 202 in order to stop the drive signal DS. Accordingly, the transistor 205 is cut off so that the first DC voltage Vout1 is not supplied to the information processing system.

As explained above, in a conventional art, the status supervisory unit 212 generates the oscillation stop signal OSS to the PWM control unit 204 of the power control circuit 202 in the waiting state, and the PWM control unit 204 stops the drive signal DS to the transistor 205 so that the first DC voltage Vout1 from the transformer 206 is stopped. Accordingly, it is possible to reduce the power consumption during a predetermined time interval when the user is not using the information processing system.

In general, the main power supply unit 200 is used for supplying the first DC voltage Vout1 to the drive units, for example, a CRT, a liquid crystal display apparatus, a floppy disk drive, etc., having relatively large power consumption. On the other hand, the control power supply unit 210 is used for supplying the DC voltage to the control units, for example, an input port of a microprocessor, or a memory having a relatively small power consumption. That is, the memory always needs to back-up through the control power supply unit 210.

Further, the status supervisory unit 212 stops the oscillation stop signal OSS when the user accesses the keyboard or mouse. When the oscillation stop signal OSS is stopped, the PWM control unit 204 generates the drive signal DS to the transistor 205. Accordingly, the transistor 205 is activated again so that the transformer supplies again the first output DC voltage Vout1 to the information processing system.

As explained above, the power control circuit 202 has a structure which stops the drive signal DS in response to the oscillation stop signal OSS, and the power control circuit 202 is commercially available as a control element (an IC element) used as a switching regulator. Accordingly, it is easy to perform the power-saving control by inputting the oscillation stop signal OSS to a predetermined terminal of the IC element.

In the above-mentioned power supply apparatus, however, the DC power supply to the power control circuit 202 is switched between the start circuit 201 and the transformer 206 in response to generation of the supplemental DC power SP from the transformer 206. As explained above, the drive signal DS from the power control circuit 202 to the transistor 205 is stopped when the oscillation stop signal OSS is input from the status supervisory unit 212 to the power control circuit 202. Accordingly, when the supplemental DC power SP is not supplied from the transformer 206 to the power control circuit 202, the start circuit 201 always supplies the DC voltage to the power control circuit 202, and the power is consumed in these circuits 201 and 202.

In this case, the power consumption due to the current flowing in the power control circuit 202 through the start circuit 201 is very small compared to the power consumption due to the current flowing from the main power supply unit to the information processing system. However, this very small power consumption in the start circuit 201 and the power control circuit 202 serves no useful purpose.

On the other hand, it is necessary to eliminate such small and useless power consumption in order to satisfy the above-mentioned international standard (NUTEK; Spec 803299).

Accordingly, the object of the present invention is to provide a power supply unit with a power-saving function enabling a minimum power supply necessary for operation in an information processing system in a waiting state.

Figure 2:
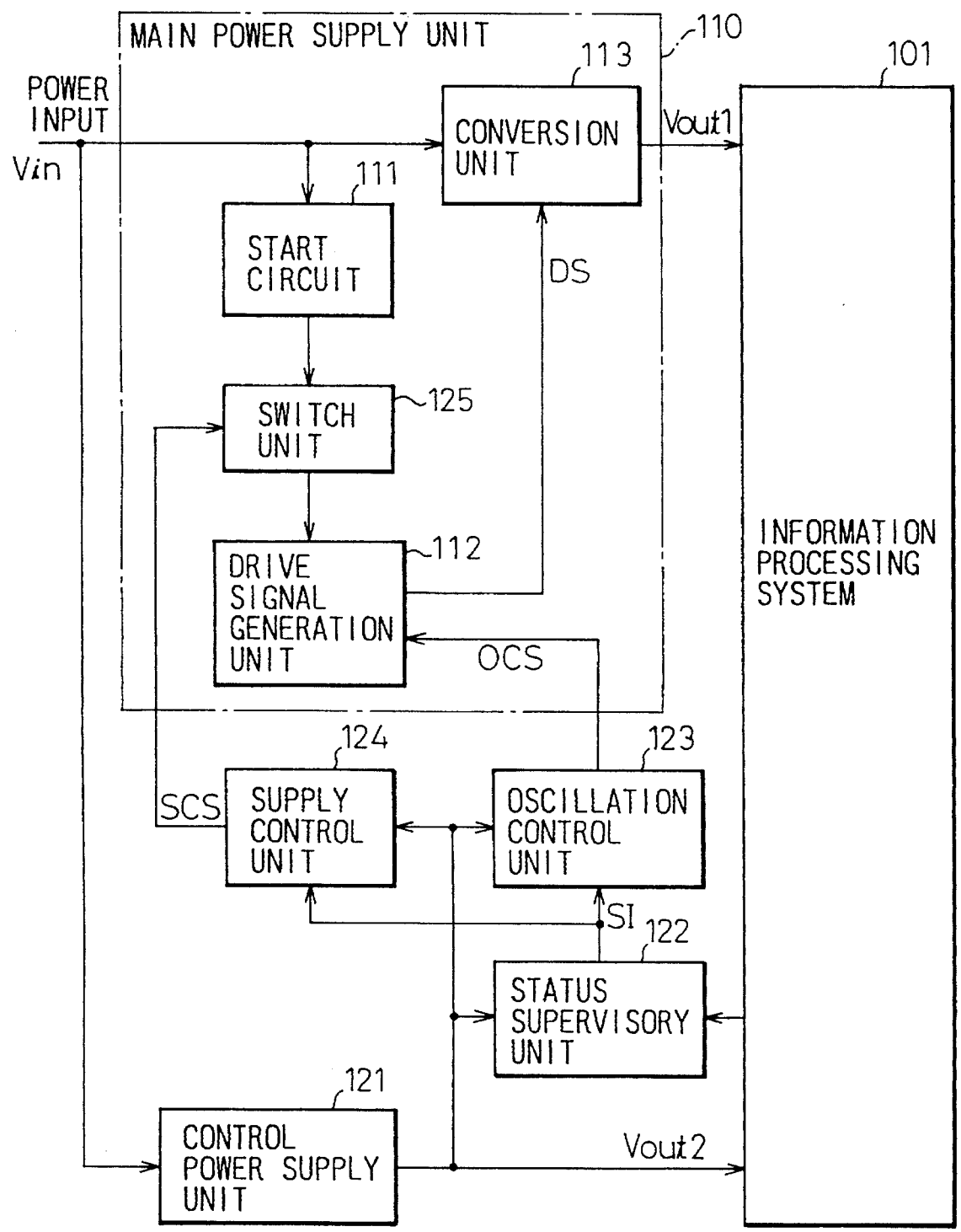
FIG. 2 is a basic block diagram of a power supply apparatus with a power-saving function according to a first aspect of the present invention.

FIG. 2 is a basic block diagram of a power supply apparatus with a power-saving function according to the first aspect of the present invention. In FIG. 2, a main power supply unit 110 includes a start circuit 111, a conversion unit 113, a switch unit 125, and a drive signal generation unit 112. The first input DC voltage Vin is supplied to the start circuit 111 and the conversion unit 113, and further is supplied to the drive signal generation unit 112 through the switch unit 125. The drive signal generation unit 112 generates the drive signal DS to the conversion unit 113, and the conversion unit 113 converts the input DC voltage Vin to the first output DC voltage Vout1 in response to the drive signal DS.

The conversion unit 113 corresponds to the transformer 206 in FIG. 1. That is, the conversion unit 113 receives the input DC voltage Vin and converts to the AC voltage in response to the drive signal DS in the primary side, and further converts to the lower AC voltage in the secondary side and obtains the first output DC voltage Vout1 which is supplied to the information processing system 101.

Still further, the input DC voltage Vin is input in parallel to the control power supply unit 121 which outputs the second output DC voltage Vout2 to the information processing system 101. The second output DC voltage Vout2 is supplied to the control units of the information processing system 101 in order to maintain the contents of the microprocessor and memory.

The status supervisory unit 122 supervises the status of use of the information processing system and outputs status information SI, which indicates whether the system is in use or not, to a supply control unit 124 and the oscillation control unit 123. The oscillation control unit 123 generates an oscillation control signal OCS to the drive signal generation unit 112 in response to the status information SI so that it is possible to stop the drive signal DS.

The supply control unit 124 generates a switch control signal SCS to the switch unit 125 so that the switch is turned on/off in response to the switch control signal SCS and the input DC voltage Vin is supplied from the start unit 111 to the drive signal generation unit 112 through the switch unit 125.

As explained above, in the waiting state, the oscillation control unit 123 generates the oscillation control signal OCS to the drive signal generation unit 112 in order to stop the drive signal DS. Further, the switch unit 125 is turned off so that the output DC voltage Vin from the start unit 111 is cut off. Accordingly, it is possible to eliminate the useless power consumption in the main power supply unit 110. When the waiting state is released by the user through the keyboard or mouse, the switch unit 125 is turned on and the drive signal generation unit 112 generates the drive signal DS to the transformer 113. Accordingly, it is possible to supply the output DC voltage Vout1 to the information processing system 101.

Figure 3:
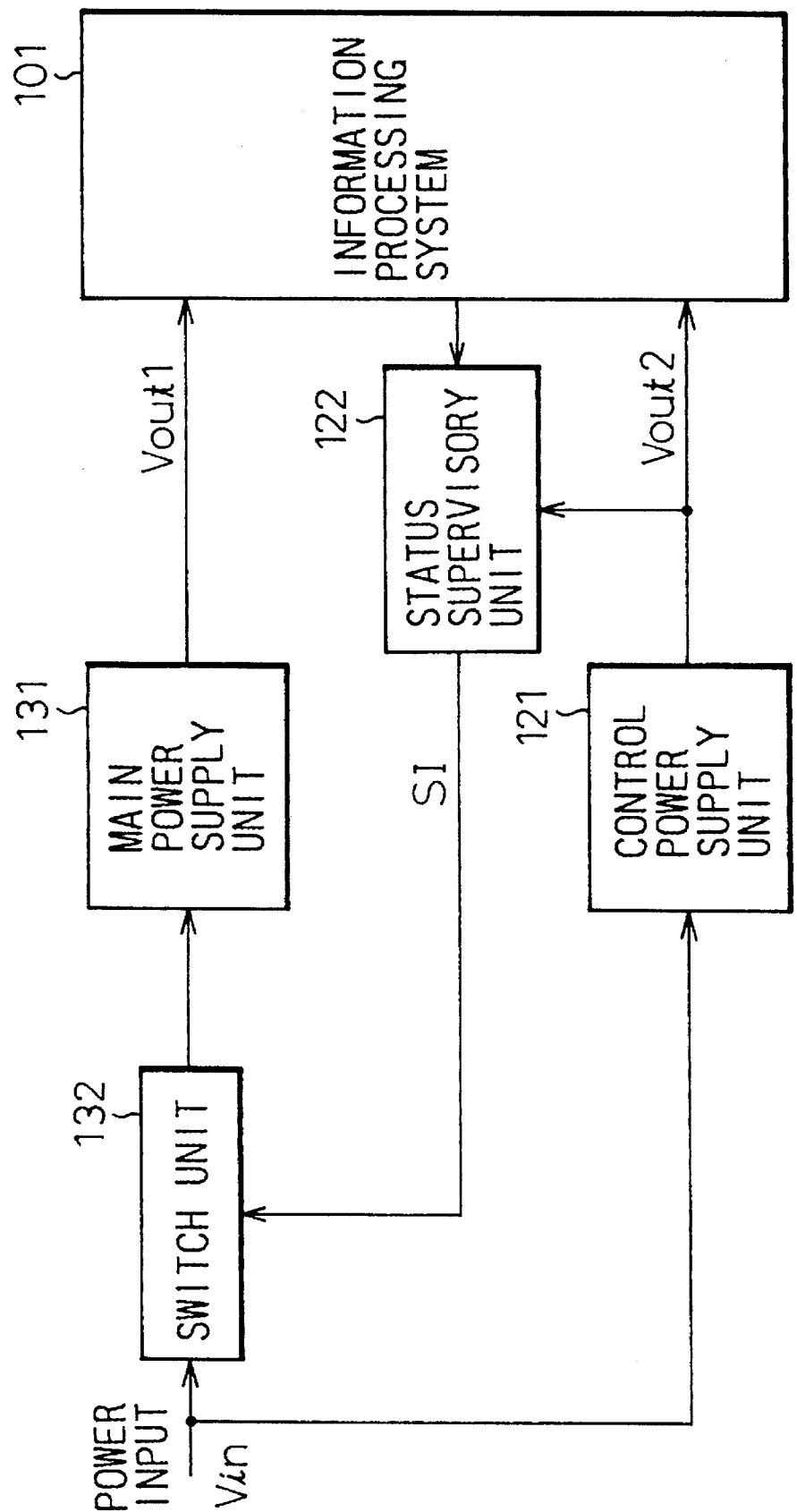
FIG. 3 is a basic block diagram of a power supply apparatus with a power-saving function according to a second aspect of the present invention.

FIG. 3 is a basic block diagram of a power supply apparatus with a power-saving function according to the second aspect of the present invention. This apparatus includes the switch unit 132, the main power supply unit 131, the control power supply unit 121, and the status supervisory unit 122.

The main power supply unit 131 converts the input DC voltage Vin to the first output DC voltage Vout1 and supplies the output DC voltage Vout1 to the drive units in the information processing system 101. The control power supply unit 121 converts the input DC voltage Vin to the second output DC voltage Vout2 and supplies the second output DC voltage Vout2 to the control units in the information processing system 101.

The status supervisory unit 122 supervises the status of use of the information processing system 101 and outputs the status information to the switch unit 132. The switch unit 132 is switched in response to the status information SI in order to supply the input DC voltage Vin to the main power supply unit 131.

In the waiting state of the system, the switch unit 132 is turned off so that the input DC voltage Vin from the main power supply unit 131 to the information processing unit 101 is cut off.

Figure 4:
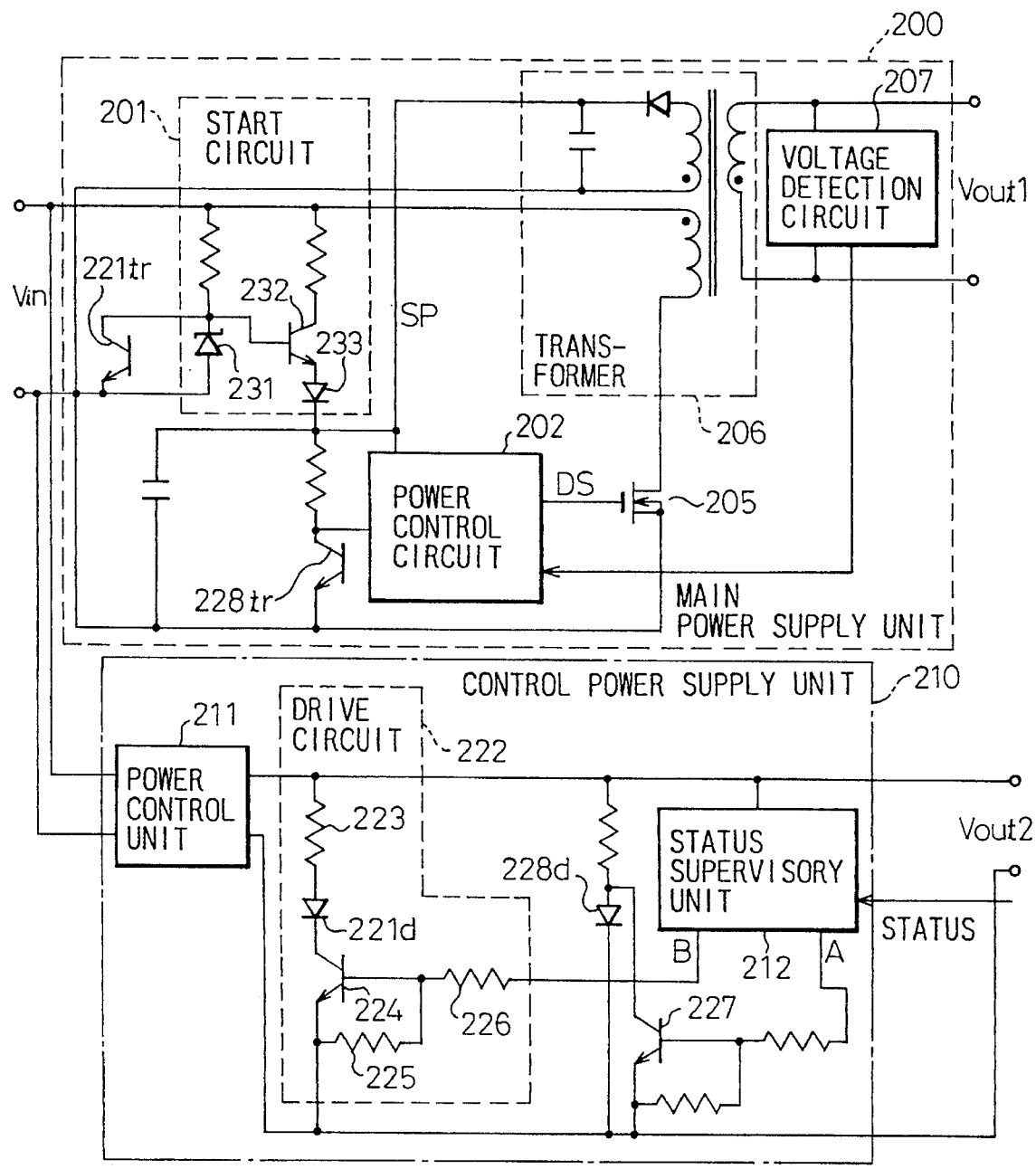
FIG. 4 shows a first embodiment of the power supply apparatus with a power-saving function shown in FIG. 2.

FIG. 4 shows a first embodiment of the power supply apparatus with a power-saving function shown in FIG. 2. As shown in the drawing, the main power supply unit 200 includes the start circuit 201, the power control circuit 202, the transformer 206, the voltage detection circuit 207, and a photocoupler 221. The control power supply unit 210 includes the power control unit 211, the drive circuit 222, and the status supervisory unit 212.

In the control power supply unit 210, a light emission element 221d of the photocoupler 221 is connected in the forward direction to an output of the power control unit 211, which corresponds to the control power supply unit 121, through a resistor 223. The cathode of the light emission element 221d is grounded through a transistor 224.

The drive circuit 222 is formed by the transistors 224, and resistors 223, 225 and 226, and the transistor 224 is turned on/off in response to an instruction from the status supervisory unit 212 which corresponds to the status supervisory unit 122, in order to drive the photocoupler 221.

A light reception element 221tr of the photocoupler 221 is connected in parallel to a Zener diode 231 on the input side of the start circuit 201 in the main power supply unit 200.

In the drawing, when the transistor 232 is turned on in response to a cathode potential of the Zener diode 231, the start circuit 201 supplies the input DC voltage Vin to the power control circuit 202 through a diode 233 which is connected in the forward direction to an emitter of a transistor 232.

The supplemental DC power SP is supplied from the transformer 206 to the cathode of the diode 233. Either the power from the start circuit 201 or the supplemental DC power SP from the transformer 206 is selectively supplied to the power control circuit 202 in response to the cathode potential of the diode 233. That is, when the transformer 206 is activated in response to the drive signal DS from the power control circuit 202, the cathode potential of the diode 233, to which the supplemental DC power SP is supplied, is raised so that the power supply from the start circuit 201 is cut off. Accordingly, the supplemental power SP is supplied to the power control unit 202.

Further, the voltage detection circuit 207 is connected to the secondary side of the transformer 206. The voltage detection circuit 207 feeds back the second output DC voltage Vout2 to the power control unit 202 in order to stabilize the first output DC voltage Vout1.

When the status supervisory unit 212 detects the waiting state based on the status information (STATUS) input from the keyboard or mouse, a terminal A thereof is changed from a logic "0" to a logic "1" and the logic "1" is sent to the base of the transistor 227. Accordingly, the transistor 227 is turned on so that the light emission element 228d of the photocoupler is turned off and stops light emission therefrom.

Accordingly, the light reception element 228tr of the photocoupler 228 is turned off so that the logic "1" (high potential) is sent to the power control circuit 202. In response to the logic "1", the power control circuit 202 stops the drive signal DS so that the transistor 205 is turned off. In this case, the power control circuit 202 is designed so as to stop the oscillation when the logic "1" is input thereto by using a known circuit (not shown).

Accordingly, since the transistor 227 and the photocoupler 228 are operated in response to the output of the status supervisory unit 212, it is possible to realize the function of the oscillation control unit 123 (see FIG. 2), i.e., generation of the oscillation control signal OCS, so that it is possible to control generation of the drive signal DS from the power control circuit 202.

Further, the status supervisory unit 212 sends the logic "1" indicating the waiting state from a terminal B thereof to the base of the transistor 224 through the resistor 226 of the drive circuit 222.

In response to the logic "1" (status information SI), the transistor 224 is turned on so that the light emission element 221d of the photocoupler 221 emits the light therefrom. Accordingly, the light reception element 221tr is turned on so that the Zener diode 231 is shorted and the transistor 232 is turned off.

Still further, when the status supervisory unit 212 detects the release (interrupt) of the waiting state, the status supervisory unit 212 releases the oscillation stop signal OSS, instructs re-transfer of the drive signal DS to the power control circuit 202, and sends the logic "0" as the status information to the base of the transistor 224.

Accordingly, transistor 224 is turned off so that the light emission element 221d of the photocoupler 221 stops the light emission therefrom. As a result, the light reception element 221tr is turned off so that the voltage of the Zener diode 231 is applied to the base of the transistor 232 and the transistor 232 is turned on again.

As explained above, the photocoupler 221 is activated in response to the status information SI in order to control turning on/off of the transistor 232 of the start circuit 201, the supply control unit 124 (see FIG. 2) and the switch 125 (see FIG. 2) are driven by the photocoupler 221 and the drive circuit 222, and the power from the start circuit 201 to the power control circuit 202 can be controlled.

Accordingly, the control power supply unit 121 (see FIG. 2) supplies the minimum power, which is necessary for only maintaining the contents of the memory, to the information processing system 101. The useless current flowing in the start circuit 201 is eliminated so that the useless power consumption can be reduced effectively in the main power supply unit 200 in the waiting state.

Still further, it is possible to use various switching elements, for example, a relay, instead of the photocoupler 221 as explained below.

Figure 5:
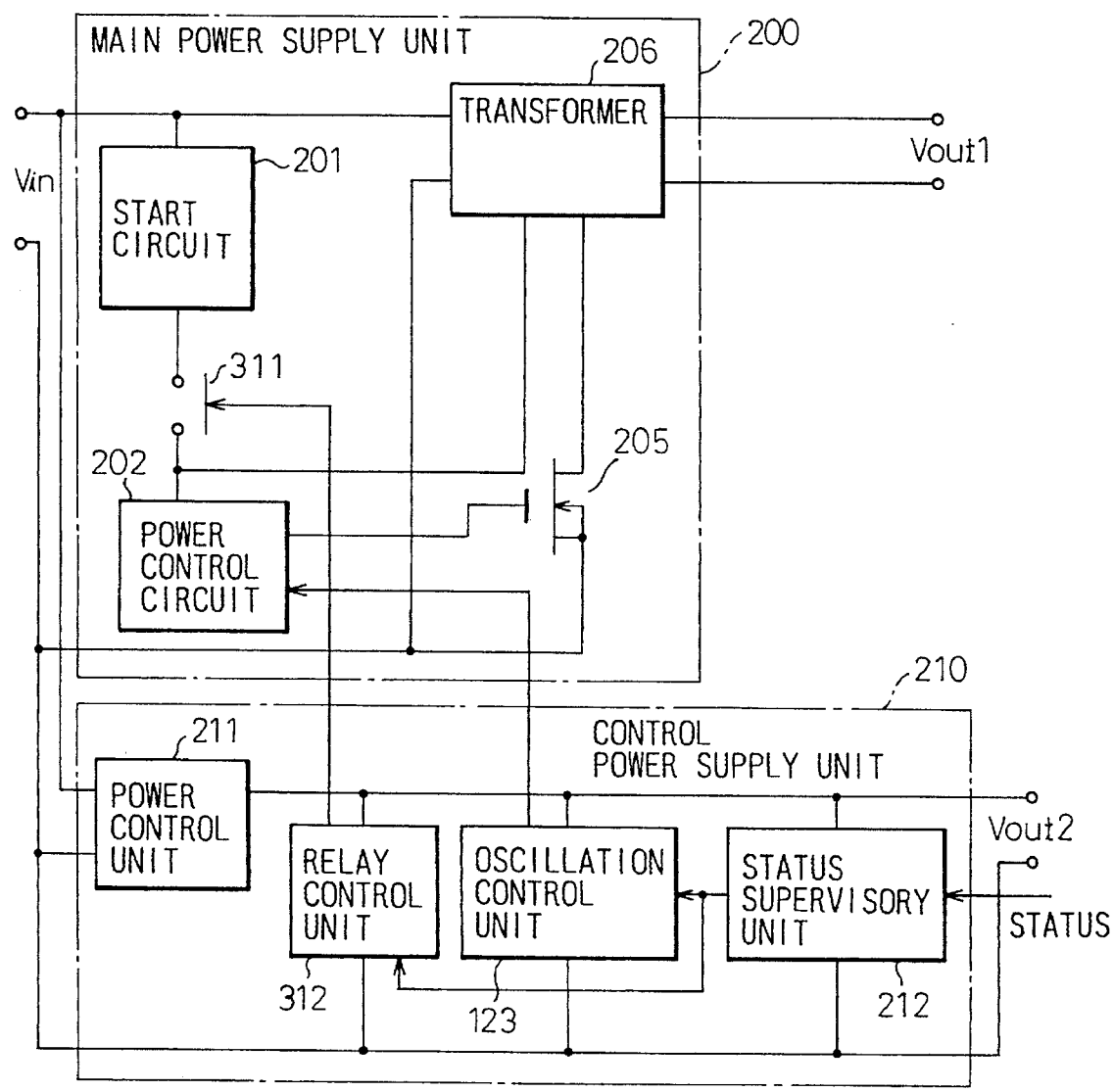
FIG. 5 shows a second embodiment of the power supply apparatus with a power-saving function shown in FIG. 2.

FIG. 5 shows a second embodiment of the power supply apparatus with a power-saving function shown in FIG. 2.

The relay 311 is used as the switch unit instead of the light reception element 221tr of the photocoupler 221, and the power is supplied from the start circuit 201 to the power control circuit 202 through the relay 311.

In the drawing, the control power supply unit 210 includes a relay control circuit 312 used as the supply control unit 124 instead of the drive circuit 222. The relay control circuit 312 controls on/off operation of the relay 311 in response to the status information SI from the status supervisory unit 212.

Most operations of this circuit except for the relay control unit are the same as in the first embodiment, so that a detailed explanation thereof is omitted.

Figure 6:
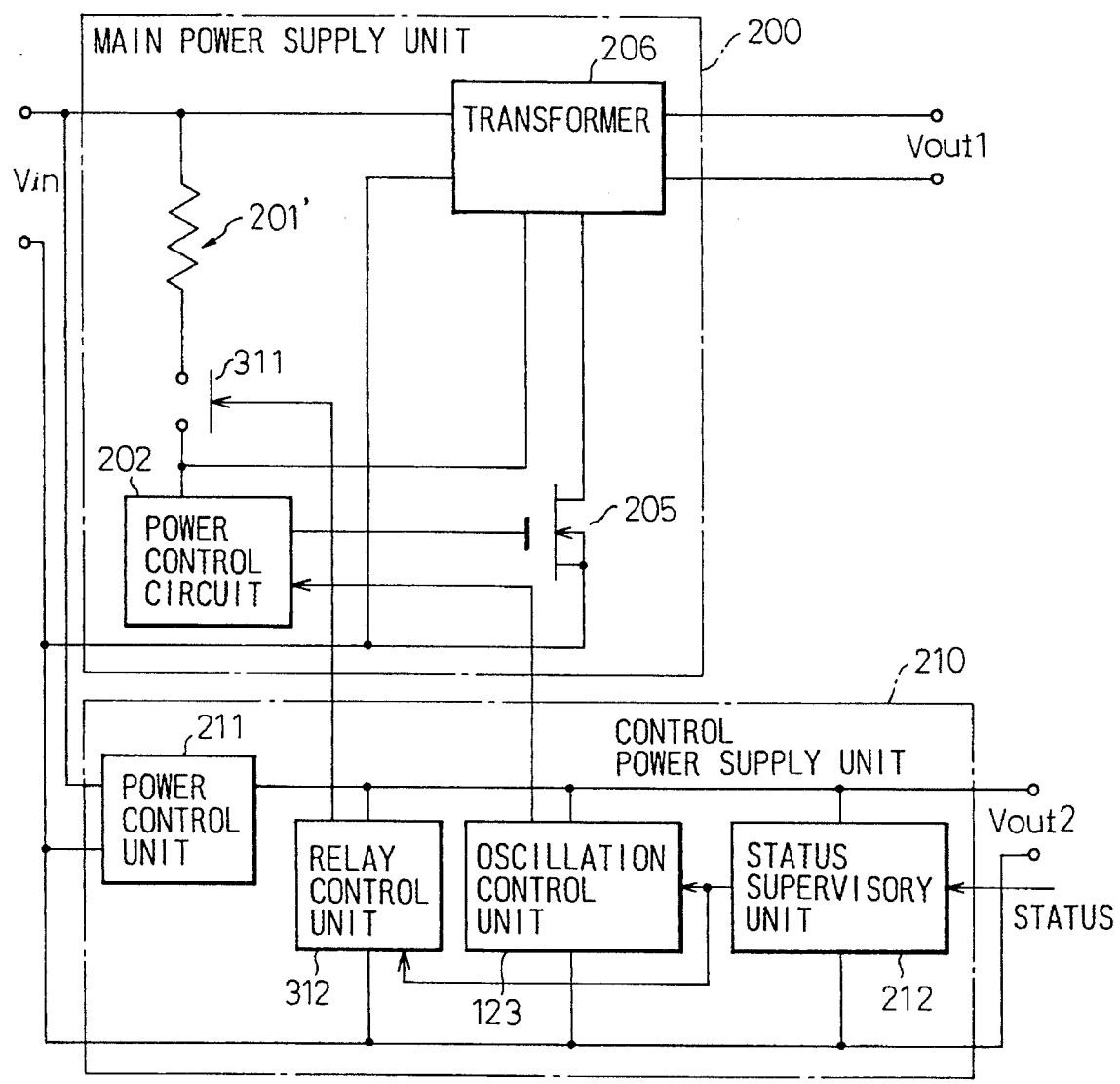
FIG. 6 shows a third embodiment of the power supply apparatus with a power-saving function shown in FIG. 2.

FIG. 6 shows a third embodiment of the power supply apparatus with a power-saving function shown in FIG. 2. In this embodiment, a resistor 201' is provided instead of the start circuit 201 so that it is possible to realize a cost reduction of the apparatus.

When the relay 311 is used as the switch 125, it is possible to use the resistor 201' in place of the start circuit 201. Most operations of this circuit are the same as the second embodiment, so that a detailed explanation thereof is omitted.

Figure 7:
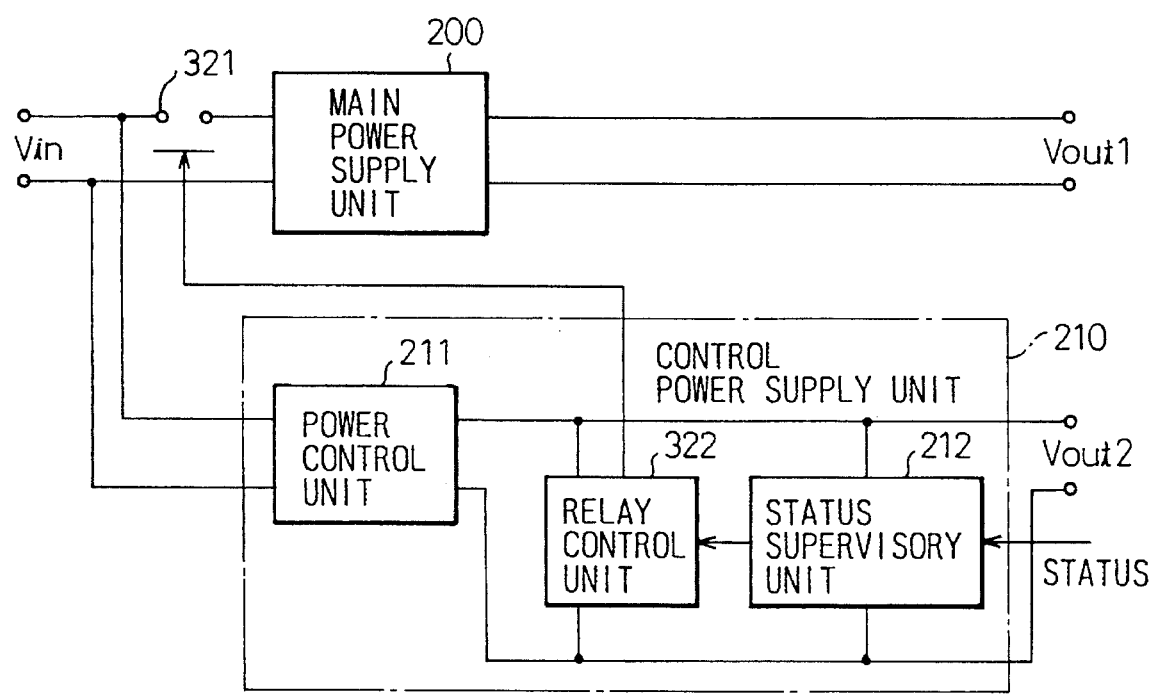
FIG. 7 shows one embodiment of the power supply apparatus with a power-saving function shown in FIG. 3.

FIG. 7 shows one embodiment of the power supply apparatus with a power-saving function shown in FIG. 3. In the drawing, the main power supply unit 200 receives the input DC voltage Vin through the relay 321. On the other hand, the control power supply unit 210 directly receives the input DC voltage Vin. The output side of the power control unit 211 includes the relay control unit 322 and the status supervisory unit 212. The relay control unit 322 controls the on/off operation of the relay 321. That is, the relay 321 is turned off in response to the status information SI indicating the waiting state, and is turned on in response to the status information indicating the release of the waiting state. Accordingly, it is possible to control the power supply to the main power supply unit 200.

Figure 8:
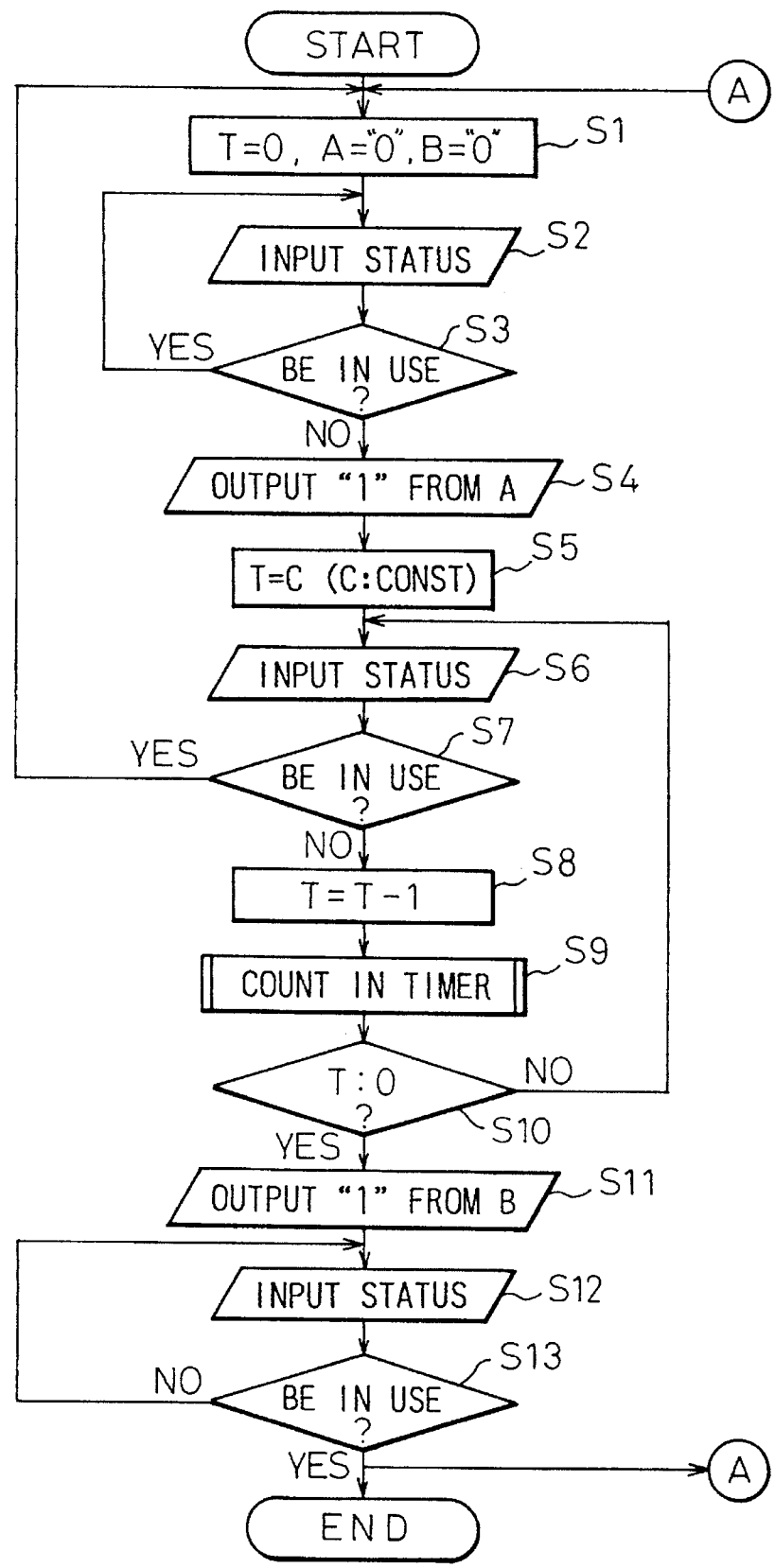
FIG. 8 is a flowchart for explaining the operation of a status supervisory unit in FIG. 2.

FIG. 8 is a flowchart for explaining the operation of the status supervisory unit shown in FIG. 4. In the status supervisory unit 212, initially, the terminals A and B are set to logic "0", and the timer (not shown) therein is set to "T=0" (step S1). The status information (STATUS) is input from the keyboard or mouse to the status supervisory unit (step S2). Whether the system 101 is in use or not is checked based on the status information (step S3). When the system is not being used (NO, in step S3), the status supervisory unit 212 outputs a logic "1" from the terminal A (step S4) to the transistor 227.

Further, after the timer counts a predetermined time "C" (constant value) (step S5), the status information is input from the keyboard or mouse to the status supervisory unit (step S6). Whether the system 101 is in use or not is checked based on the status information (step S7). When the system is not being used (NO, in step S7), the timer is decremented by one (step 8). The count of the timer is continued (step S9), and whether the count is "zero" or not (step S10) is checked (step S10). When the count is "zero" (YES, in step S10), the status supervisory unit 212 outputs "1" from the terminal B (step S11) to the transistor 224.

Still further, after the status supervisory unit 212 outputs "1", the status information is input from the keyboard or mouse to the status supervisory unit, and whether the system 101 is in use or not is checked based on the status information (step S13).

When the system is in use (YES, in step S13), the process returns to the step S1, and the same processes explained above are repeated.

I claim:

1. A power supply apparatus with a power-saving function for use in an information processing system, comprising:
 main power supply means (110) including: start means (111), switch means (125), drive signal generation means (112) and conversion means (113); said start means receiving an input voltage (Vin) and starting said drive signal generation means through said switch means; said drive signal generation means generating a drive signal (DS) to said conversion means; and said conversion means converting the input voltage to a first output voltage (Vout1), and outputting the first output voltage to said information processing system (101) in response to the drive signal;

control power supply means (121) receiving the input voltage (Vin), converting the input voltage to a second output voltage (Vout2), and outputting the second output voltage to said information processing system;

status supervisory means (122) connected to said information processing system for supervising the status of the system and indicating whether the system is in use or not, and outputting status information (SI);

oscillation control means (123) connected between said status supervisory means and said drive signal generation means for generating an oscillation control signal (OCS) to said drive signal generation means in order to control generation of the drive signal in accordance with the status information; and supply control means (124) connected between said status supervisory means and said switch means for generating a switch control signal (SCS) to said switch means in order to control turning on/off of said switch means, and said switch means connecting or disconnecting said start means and said drive signal generation means to or from each other.

2. A power supply apparatus as claimed in claim 1, wherein said switch means comprises a relay, and said control power supply means further comprises a relay control unit for receiving the status information (SI) and generates the switch control signal (SCS) to said relay in order to control turning on/off thereof.

3. A power supply apparatus as claimed in claim 1, wherein said start means is formed by one resistor.

4. A power supply apparatus with power-saving function for use in an information processing system, comprising:

switch means for receiving an input voltage (Vin) comprising a relay;

main power supply means for receiving the input voltage through said switch means, converting the input voltage to a first output voltage to said information processing system;

control power supply means for receiving the input voltage (Vin), converting the input voltage to a second output voltage (Vout2), and outputting the second output voltage to said information processing system wherein said power supply means comprises a relay control unit for receiving status information (SI) and generating a switch control signal (SCS) to said relay in order to control turning on/off thereof and;

status supervisory means connected to said information processing system for supervising the status of the system and indicating whether the system is in use or not, and outputting status information (SI) to said switch means in order to control turning on/off thereof in accordance with the status information.

* * * * *